Figure 10:
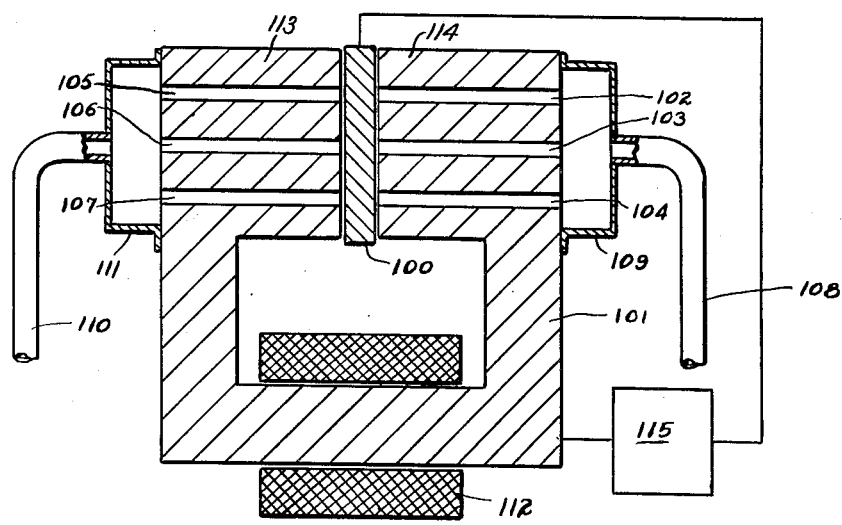

Oct. 2, 1962 K. H. STEIGERWALD 3,056,587
METHODS OF EFFECTING A HIGH RATE OF HEAT TRANSFER
FROM A HEATED SURFACE TO A LIQUID
Filed Feb. 26, 1957 5 Sheets-Sheet 1
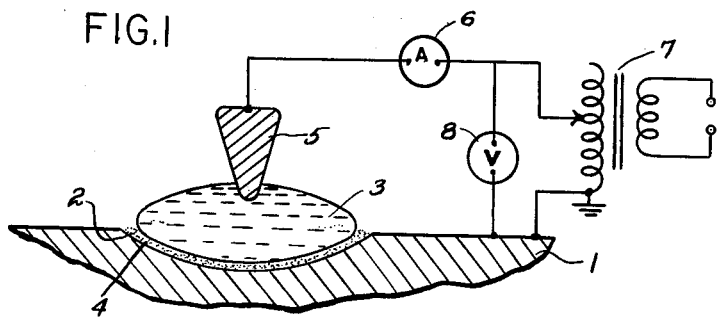
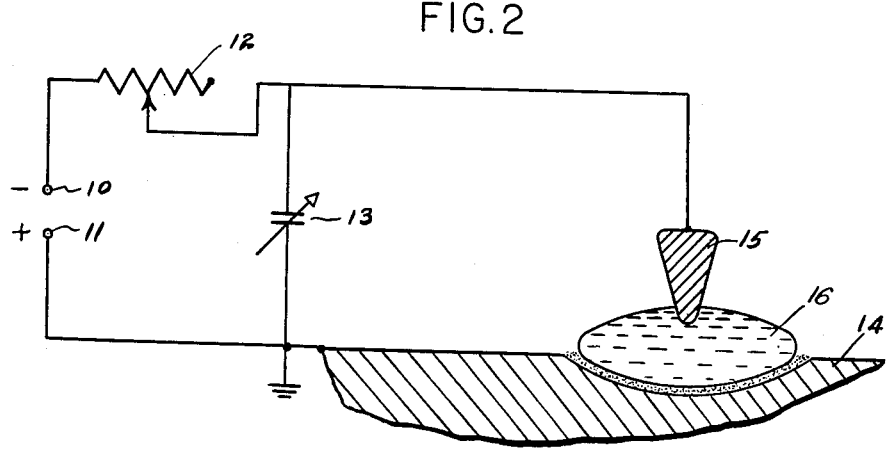
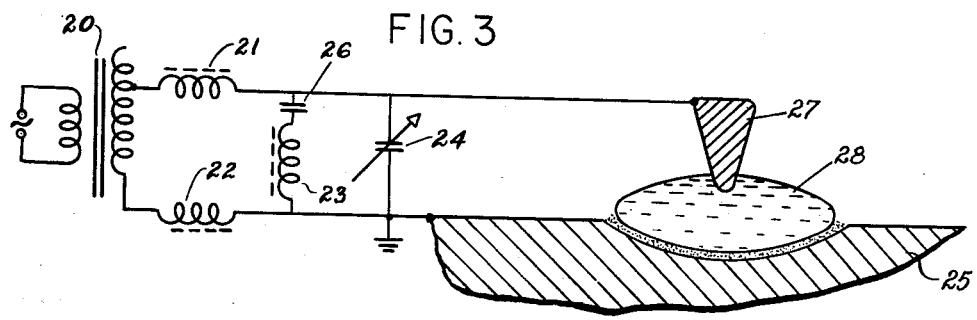
INVENTOR.
Karl H. Steigerwald
BY
Emery, Whittemore, Sandoe & Dix
ATTORNEYS

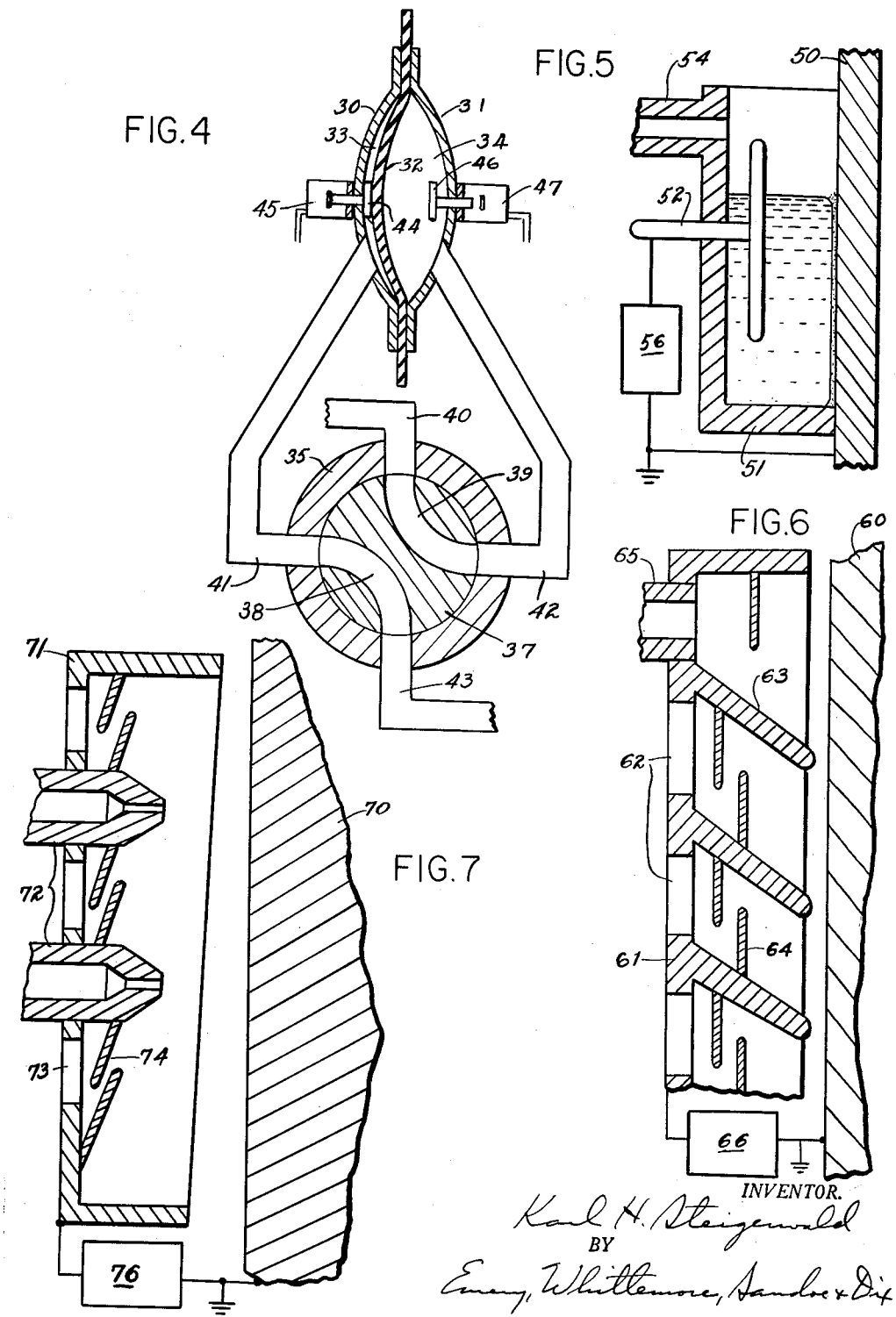

Oct. 2, 1962  K. H. STEIGERWALD  3,056,587
METHODS OF EFFECTING A HIGH RATE OF HEAT TRANSFER
FROM A HEATED SURFACE TO A LIQUID
Filed Feb. 26, 1957  5 Sheets-Sheet 3
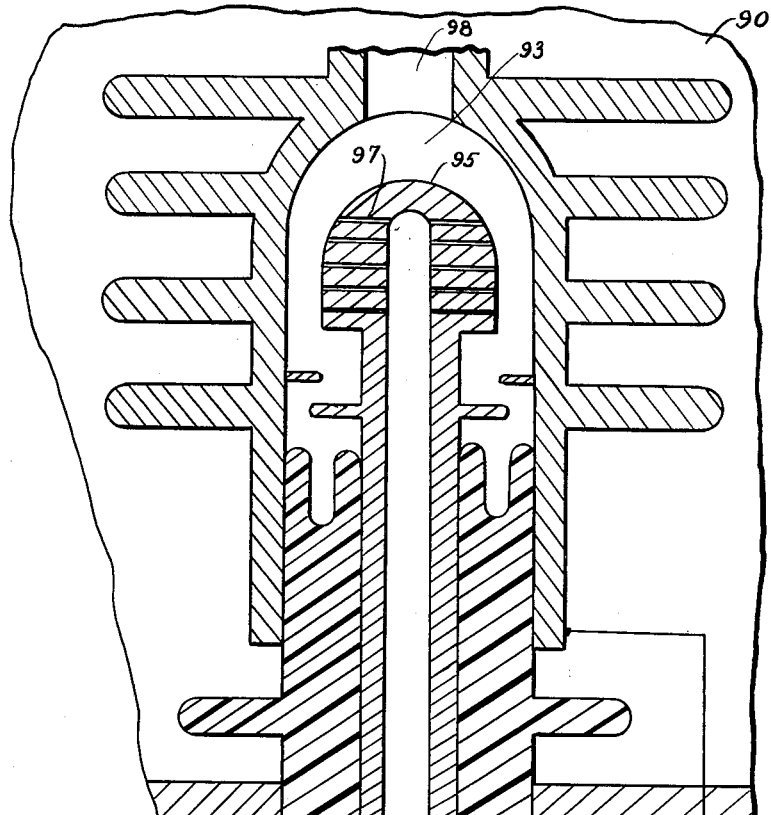
FIG. 9
FIG. 8
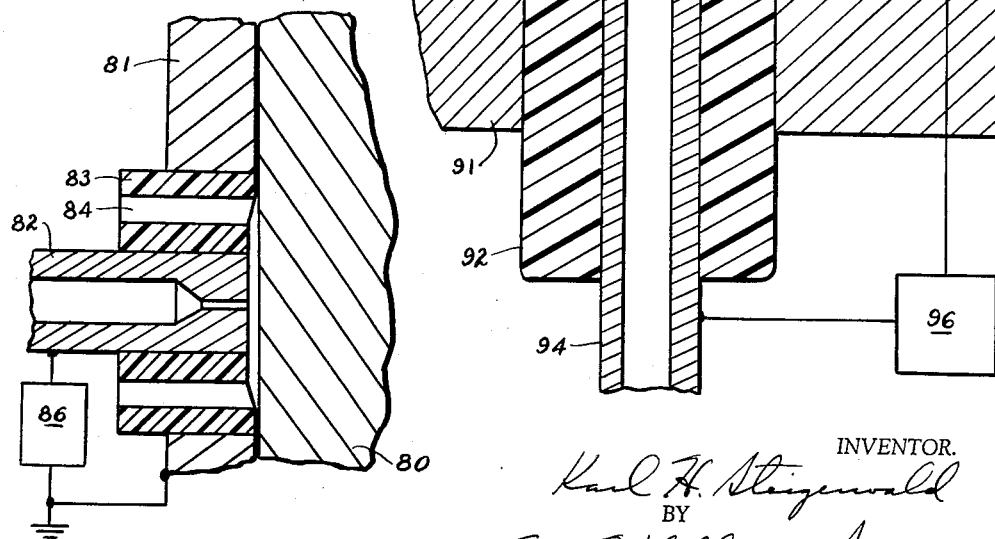
INVENTOR.
Karl H. Steigerwald
BY
Emery, Whittemore, Sandoe & Dix
ATTORNEYS United States Patent Office 3,056,587
Patented Oct. 2, 1962

3,056,587
METHODS OF EFFECTING A HIGH RATE OF HEAT TRANSFER FROM A HEATED SURFACE TO A LIQUID
Karl Heinz Steigerwald, Sauerbruch Strasse 10, Heidenheim, Germany
Filed Feb. 26, 1957, Ser. No. 642,459
2 Claims. (Cl. 257—1)

This invention relates to a method of effecting a high rate of heat transfer from a heated surface to a liquid.

This application is a continuation in part of my copending application Serial No. 574,318, filed March 27, 1956, and now abandoned.

The invention is applicable to a wide range of uses where it is desired to transfer heat rapidly from a heated surface of metal or any other suitable material to water or other liquid which is electrically conductive or made conductive. For example, the invention may be used in boilers and the like in which the objective is to heat water rapidly for the generation of steam. It is also useful, on the other hand, in operations such as metal casting in which the objective is to cool the metal rapidly. Other applications are possible regarding surfaces of non-metallic materials such as graphite, ceramics and glass. In addition to surfaces of solid substances the invention may be applied to boundary surfaces of liquids, vapors or gases or mixtures of substances present in different states of aggregation. In all such cases, the rate of heat transfer from the heated surface to the liquid is of the highest importance, but it is known that a factor which seriously limits the rate of heat transfer is the film of vapor which tends to form between the metal surface and the liquid whenever the temperature of the metal surface greatly exceeds the boiling point of the liquid. For example, if the liquid is water and the temperature of a heated surface is in the region of 300° C. or above, a film of steam is created which separates the water from the heated surface. This is known as the Leidenfrost phenomenon and, due to the fact that the thermal conductivity of steam is low, the steam film seriously retards the transfer of heat from the heated surface to the water.

In the past efforts have been made to overcome this difficulty by attempting to break up the steam film by agitation, high velocity flow and the like, but such efforts have met with only indifferent success. Sonic and supersonic vibrations have also been tried without success.

The object of this invention is to provide a method to effectively penetrate the steam film in order to increase the rate of heat transfer. This method is based on the fact that the electrical characteristics of the steam film are different from those of the liquid and the heated surface. For example, whereas a metal surface and water are both electrically conductive, the steam film is relatively non-conductive. On the other hand, surfaces of materials having the properties of electrical insulators can be made to some extent conductive by methods which are well known. Non-conductive liquids can be made conductive by certain admixtures as are well known. Gases and vapors may be conductive on account of ionization.

According to the invention the rate of heat transfer between a heated surface maintained at a temperature of 300° C. or more and a liquid is increased by applying an electrical potential between the heated surface and the liquid, said electrical potential being so high that elecrical discharges are effected which penetrate the steam film. Direct current, pulsating direct current or alternating current may be used in practicing the invention, but I prefer to use direct current which the negative voltage applied to the electrode in contact with the liquid. That is, the electrode in contact with the liquid is the cathode. In most cases, the rate of heat transfer is improved when direct current is applied in this manner.

In order to further increase the effect of said electrical discharges, a magnetic field may be produced in and/or near the space of the discharge zone. This magnetic field effects an increase of breadth and/or an additional motion of the electrical discharges.

It results from experiments that applying of an alternating-current voltage of 220 volts with 50 cycles produces a satisfactory result if the temperature of the heated surface is between 300° and 400° C. If the temperature of the heated surface is increased, it is desirable to increase the potential.

Figure 11:
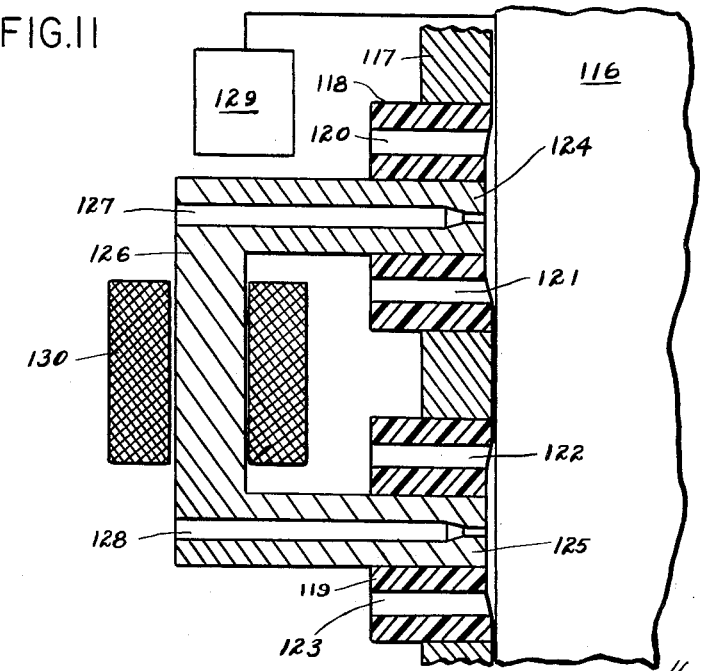

For the purpose of describing the method of the invention in detail preferred embodiments are illustrated in the accompanying drawings, in which FIG. 1 is a semi-diagrammatic view, partly in section, FIG. 2 is a similar view showing a modified form of circuit, FIG. 3 is a similar view showing another modified form of circuit, FIG. 4 is a diagrammatic view of an arrangement for electrically separating the liquid from the rest of the liquid distributing system, FIGS. 5–9 show manifold arrangements for cooling of heated surfaces, FIGS. 10 and 11 show arrangements for applying a magnetic field.

In the arrangements illustrated in FIGS. 1–9 for example water is used as liquid in contact with the heated surfaces. The arrangement shown in FIG. 1 comprises a relatively large steel plate 1 having a depression 2 formed therein to receive and hold a measured quantity of water 3. If the steel plate 1 is heated to a temperature of 300° C. or above, and if the measured quantity of water is then poured into the depression 2, a steam film 4 is formed immediately which separates the water from the metal as illustrated diagrammatically in FIG. 1. Under these conditions the heat flow from the metal surface to the water is relatively slow and primarily by radiation. Thus, by test, with the steel plate 1 maintained at a temperature of 300° C., and on pouring 4 ccm. of water at a temperature of 10° C. into the depression 2, it was determined that a period of 210 seconds was required to evaporate 3 ccm. By calculation, 1887 calories are required to evaporate 3 ccm. of water under these conditions. Therefore, for the required period of 210 seconds, the average rate of heat transfer was approximately 9 calories per second.

Having thus determined the rate of heat flow to be expected without the use of the invention, next a comparative test was made, utilizing the method of the present invention to increase the rate of heat transfer. For this purpose, the electrode 5 was placed in position to contact the water, and said electrode was connected to an adjustable member of a variable transformer 7. The secondary coil of said transformer is also connected to the plate 1 and grounded, as illustrated. The primary coil is connected to a suitable source of electric current, as for example alternating current of 220 volts and 50 cycles. If desired, a voltmeter 8 and ammeter 6 may be included in the circuit, as illustrated.

In the use of apparatus, as above described, and maintaining the temperature of the plate 1 at approximately 300° C., if the voltage is low, i.e. below 100 volts, little or no current flow will be indicated by the ammeter 6. But if the voltage is increased to between 100 and 150 volts a change occurs. The rate of evaporation increases perceptibly, accompanied by visible steam formation. At the same time, electrical discharges from the water 3 to the plate 1 were visible.

For purposes of comparative test, the conditions were the same as before, i.e. the plate 1 was maintained at a temperature of 300° C. and 4 ccm. of water at a temperature of 10° C. was poured into the depression 2. At the same time the transformer 7 was adjusted to supply 220 volts at 50 cycles. An average current of .07 ampere was observed by the ammeter 6. Under these conditions, a period of only 20 seconds was required to evaporate 3 ccm. of water.

By calculation, the electric current at 220 volts and .07 ampere applied during a period of 20 seconds would introduce 73 calories into the water. Deducting this quantity from the 1887 calories required to evaporate 3 ccm. of water, starting at 10° C., leaves a balance of 1814 calories to be transferred from the plate 1. Therefore, for the required period of 20 seconds, the average rate of heat transfer was approximately 90.7 calories per second, as compared with 9 calories per second without the use of electric current. That is, under the conditions described, the rate of heat transfer was increased by more than ten times by the use of the invention.

The requisite electric potential may be created in various ways in accordance with the techniques which are well known. Any suitable form of alternating current or pulsating direct current may be employed and various types of oscillating circuits known in the art may be employed to provide a high frequency discharge. Two simple forms of oscillating circuits are shown in FIGS. 2 and 3 by way of example.

In FIG. 2, the circuit includes a variable resistance 12 and a variable condenser 13 connected in the manner shown with plate 14 and electrode 15 in contact with water 16. By adjustment of the resistance 12 and of the condenser 13, the voltage and frequency may be adjusted as desired. Frequencies of several kilocycles may be achieved with this circuit, using either direct or alternating current as supply.

In FIG. 3, the circuit includes a variable transformer 20, coils 21, 22 and 23, condenser 26 and variable condenser 24 connected in the manner shown with the plate 25 and electrode 27 in contact with water 28. Again, by adjustment of the variable transformer 20 and of the variable condenser 24, the voltage and frequency may be adjusted as desired.

It may be advantageous under certain circumstances to apply a magnetic field in or near the space where the electrical discharge takes place. In this case the parts carrying the liquid or the electrical current may simultaneously be used as conductors of magnetism.

In realizing the method of the invention it must be taken into consideration that the connections to a large water distribution system, as well as the heated parts are grounded electrically. In order to be able to create sufficient arcing potential between the water and the heated surface without too great losses it is advantageous to separate electrically the water connections from the rest of the water distribution system. This can be done, for example, in the well-known manner, by using a pipe of sufficient length made of electrical insulating material. A better and technically simple arrangement for the separation can be achieved by the arrangement shown diagrammatically in FIG. 4.

Two bowls 30 and 31, electrically insulated from one another, together form a container. The interior of the container is divided into two compartments 33 and 34 by an electrical insulating membrane 32. By means of pipes 41 and 42 water can be conveyed to or exhausted from, respectively, compartments 33 and 34. A distributing valve 35 made of electrical insulating material regulates the supply and exhaust of the liquid. The cock 37 has two passages 38 and 39 which alternatively make connections between the pipes 40, 41, 42 and 43 which are connected to the distributing valve. In FIG. 4 are shown the connections 40—42 and 41—43. Pipe 40 runs from the distribution system and forces water into compartment 34 by way of 42. The water exerts pressure, practically undiminished from that in the distribution system, through the membrane 32, on the water in compartment 33. This is forced through 41 and 38 to 43. In this manner the water in compartment 33 is electrically insulated from the water in the water distribution system in so far as the parts 30, 41 and 43 are also insulated. In its end position membrane 32 operates a handle 44 which opens a switch 45. In this manner, for example, the cock 37 may be turned 90° electromagnetically so that it now effects connections 40—41 and 42—43. Now the arrangement operates in the reverse manner by filling compartment 33 and emptying compartment 34 until the membrane 32 by way of handle 46 and the switch 47 again effects 90° rotation of the valve cock 37 so that the connection 40—42 and 41—43 are reinstituted.

The arrangement in FIG. 4 operates in the known manner of a quantity measurer only with the modification that the escaping liquid in the pipe 43 is electrically insulated from the incoming liquid in pipe 43. In simple manner it is possible to equalize the pressure blow resulting from the turning of the distributing valve so that in 43 a constant pressure can be maintained.

The arrangement described in FIG. 4 is only an example in principle of the many possibilities to insulate electrically an electrically conductive liquid running in pressure pipes. In addition to the galvanic insulating method it is possible to use the known insulating method of the alternating current technique for methods using higher frequencies.

FIGS. 5–8 show schematic constructions of embodiments of the invention as used for cooling purposes.

In FIG. 5, 50 is a plate to be cooled. A container 51 made of insulating material, for example ceramic, is connected with plate 50 in such manner that an open container is formed. Between the electrode 52 and the plate 50 the potential source 56 is inserted, whereby plate 50 may be grounded. By means of the supply pipe 54 water is introduced into the tank and then evaporated.

FIG. 6 shows an arrangement which in principle operates in a manner similar to FIG. 5 but in which better provision is made for the steam outlet. Moreover, the parts carrying the water are not in contact with the surface to be cooled and consequently can be made of metal. The plate 60 is to be cooled. At a short distance from 60 is a metal water distributor 61 which has the outlet openings 62 and the baffle plates 63. Between the baffle plates 63 are placed protective plates 64 which shield the openings 62 against spray water but which still permit the steam to escape. The water fed through the supply pipe 65 is distributed by means of the baffle plates 63 in such manner that it touches as large an area as possible of the surface 60. The potential source 66 is introduced between 61 and 60 whereby plate 60 may be grounded.

The arrangement shown in FIG. 7 works with spray nozzles. One or more nozzles 72 are arranged in a distributor 71 and discharge spray against the surface of plate 70 which is to be cooled. The distributor 71 contains outlet openings 73 and protective plates 74. Between 71 and 70 the voltage generator 76 is introduced. The distributors 61 and 71 are so devised that by means of the sprays or exhaust water no electrical bridges are formed to grounded metal parts which are not to be cooled. In addition, they can be constructed in such manner that they are protected against contact.

The arrangement in FIG. 8 is an example of applying the method of the invention in a mold of a continuous casting process. The casting 80 which is to be cooled is in close contact with the wall of the mold 81. A ring 83 of refractory insulating material is press fitted into mold 81. It contains outlet passages 84. In its center a metallic spray nozzle 82 is introduced, with press fit, which sprays water against casting 80. The steam can escape through the bores 84. The potential source 86 is introduced between 82 and 81 or between 82 and 80.

All the arrangements shown in FIGS. 5–8 also can be carried out in enclosed rings. They show only a selection of arrangements which may be constructed in accordance with the object of the invention.

In addition to applications for special cooling processes, as in the case of the casting or hardening of metals, the method of the invention is also useful for other purposes. An example of this is the generation of steam, especially in installations for transformation of energy. It is possible, according to the method of the invention to generate steam in very highly heated containers and in a small space. An example for a pressure chamber for the production of high pressure steam is shown in FIG. 9. A heating chamber 90 is shown with a part of its wall 91. The pressure chamber 93 is pressure fitted upon an electrical insulator 92. Inside of the insulator the water pressure pipe 94 is pressure fitted. It is sealed by a spray head 95 and through its passages 97 the water is sprayed on the highly heated walls of 93. The potential generator 96 is introduced between 94 and 93 in which case 93 or 94 may be grounded. The pressure pipe 98 serves for leading off the steam generated.

The effect of the electrical discharges can be improved by constructing the parts carrying the liquid and/or the electric current as magnetic conductors, so that in addition to the electric field which exists between the heated surface and the liquid there shall also be produced a magnetic field. One example of equipment to produce such a magnetic field is shown in FIGS. 10 and 11.

In FIG. 10 the heated metal strip 100 is to be cooled. The strip is located between the poles 113, 114 of a magnet 101 and moves therebetween in a direction perpendicular to the plane of the paper. The poles of the magnet have passages drilled in them 102, 103, 104 and 105, 106, 107 respectively. By means of the tube 108, cooling liquid is conveyed to the distributor 109, from which it flows into the passages 102, 103 and 104, and from them against the strip 100 which is to be cooled. Correspondingly, on the other side, the tube 110 and the distributor 111 are provided to convey cooling liquid to passages 105, 106 and 107.

The magnet 101 carries a coil 112 which is traversed by an electric current which serves to excite a magnetic field between the poles 113 and 114. The magnet 101 is, at the same time, connected with the pole of a potential producer 115, the other pole of which is connected with the strip 100. Between the poles 113 and 114 there is a magnetic field which affects the electrical discharges occurring between the poles and the strip 100. These discharges are disseminated by the magnetic field so that the current density of the electric discharges is reduced. In this manner the danger of spark erosion of the strip is reduced. At the same time, the enlarging of the path of the discharge carrier will be longer from the electrode acting poles 113 and 114 to the strip, so that a higher tension can be used to produce the same current. This produces a higher cooling effect.

If the coil 112 is actuated by direct current, then there will be a widening of the discharges between the poles 113 and 114 and the strip 100. If one uses alternating current in coil 112, then the discharges will be simultaneously disseminated and actuated (vibrated).

FIGURE 11 illustrates apparatus adapted to produce a magnetic field between a cooling liquid and a hot surface within a continuous casting mold or within a cooling unit located below the mold at any distance from it, for the continuous casting of metal. The casting 116 to be cooled is in close contact with the wall of the mold 117. Two rings of refractory, 118 and 119, are inserted by pressure fit into 117. These rings are provided with passages 120, 121 and 122, 123. In the center of the rings 118 and 119 are the poles 124 and 125 of a magnet 126 having a pressure fit therein. The poles are provided with passages 127 and 128 through which cooling liquid is sprayed against 116. The steam produced can escape through the passages 120, 121, 122 and 123. One pole of potential producer 129 is connected with the magnet 126, the other pole of which is connected with casting 116. The poles 124 and 125 act at the same time in this case as electrodes and as nozzles for the supply of the cooling liquid. The effect of this arrangement corresponds to FIG. 10, and as in that case, the exciter coil 130 can be supplied with either direct or alternating current.

In the practice of the process, it has been found that the best heat transfer results are obtained if the ion content of the water is low. Preferably, therefore, if the available water supply contains dissolved substances which act as electrolytes and dissociate to form ions it should be treated to remove some or all of such substances. For example, the water may be distilled or subjected to other known processes to remove such substances. In general, I have found it advantageous to reduce the ion content of the water to a point where the electrical conductivity of the water is less than $2.0 \times 10^{-4} \Omega^{-1} cm.^{-1}$.

On the other hand, the effectiveness of the process may be improved by mixing with the water finely divided electrically conductive particles which do not dissolve in the water or which do not dissociate to form ions therein. For example, metal powders such as iron or aluminum or powdered graphite may be used.

Figure 12:
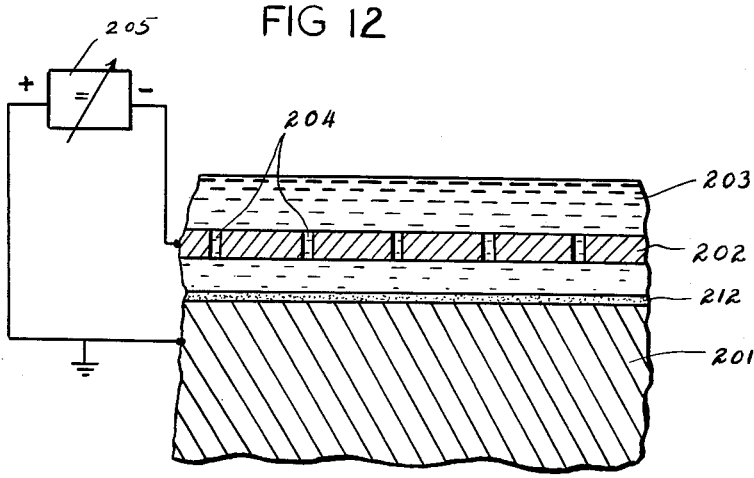
Figure 13:
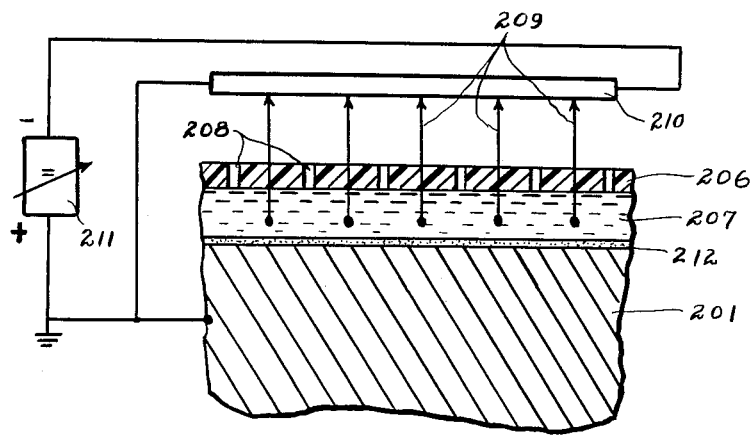

In FIGS. 12 and 13, I have illustrated constructions which are particularly well adapted for use with treated water, such as distilled water, which is very low in ion content and which, therefore, has a low electrical conductivity. In FIG. 12, the surface of the plate 201 is maintained at a temperature in excess of 300° C. and the water 203 is spaced therefrom by a film 212 of steam. The electrode 202 is immersed in the water as close as possible to the surface of plate 201, and is provided with suitable apertures 204 to permit the escape of steam. A suitable direct current generator 205 is connected to the electrode 202 and the plate 201 in the manner shown, so that the electrode has a negative voltage. The voltage supplied by the generator is variable, and is adjusted to a sufficiently high potential to penetrate and discharge through the vapor film 212.

In FIG. 13, a plate 206 of suitable electrical insulating material is immersed in the water 207, and is provided with suitable apertures 208 to permit the escape of steam. A series of electrodes 209 extend through and are supported by the plate 206. The lower ends of said electrodes extend toward the surface of plate 201, being closely spaced therefrom. The upper ends of said electrodes are connected at intervals to a resistance element 210, which is connected to the direct current generator 211 in the manner shown, so that the electrodes have a negative voltage. In this case, however, each electrode is supplied with a different voltage, depending on the effective resistance applied to each electrode. The resulting cooling effect along the surface of the plate 1 varies depending on the different voltages applied to the individual electrodes.

All arrangements shown are subject to many variations. In like manner the surfaces to be cooled can be flat or cylindrical. Their texture can be polished or rough. They can also be coated, especially with a plating produced electrolytically. The same is valid for the other parts, which are concerned in the electrical discharge.

It will be understood that the method may be used in connection with liquids other than water, provided they are sufficiently electrically conductive or can be made conductive by the use of admixtures. This is valid especially also for liquid metals.

It will also be understood that the invention may be variously modified and embodied within the scope of the following claims.

I claim as my invention:

1. In the continuous casting of metal the method of chilling the metal casting by water, under temperature conditions resulting in the complete separation of the water from the metal casting by a steam layer which comprises spraying water the conductivity of which is less than $2\times10^{-4}\Omega^{-1}cm.^{-1}$, on the surface of said casting, and maintaining an undulating unidirectional current flow from said casting into said water.

2. The method of increasing the rate of heat transfer from a heated body to water through a steam layer which completely separates the water from the heated body due to the Leidenfrost phenomenon which comprises placing water, the conductivity of which is below $$2.0\times10^{-4}\Omega^{-1}cm.^{-1}$$

in heat transfer relationship with said body by spraying the water towards the surface of said body, and applying an electrical potential between said body and said water sufficient to cause electrical current therebetween.

References Cited in the file of this patent

UNITED STATES PATENTS

| | | |
|---|---|---|
| 1,308,040 | Chubb | July 1, 1919 |
| 1,827,714 | Morrell | Oct. 13, 1931 |
| 1,835,557 | Burke | Dec. 8, 1931 |
| 2,605,377 | Kaehni et al. | July 29, 1952 |
| 2,664,394 | Reeves | Dec. 29, 1953 |
| 2,730,597 | Podolsky et al. | Jan. 10, 1956 |
| 2,772,540 | Vierkotter | Dec. 4, 1956 |